United States Patent [19]

Szydlowski et al.

[11] 4,282,832
[45] Aug. 11, 1981

[54] PROCESS FOR VAPORIZING A LIQUID HYDROCARBON FUEL

[75] Inventors: Donald F. Szydlowski, East Hartford; Vaidotas Kuzminskas, Glastonbury; Joseph E. Bittner, East Hartford, all of Conn.

[73] Assignee: United Technologies Corporation, Hartford, Conn.

[21] Appl. No.: 123,226

[22] Filed: Feb. 21, 1980

[51] Int. Cl.³ .................................................. F22B 1/02
[52] U.S. Cl. ...................................... 122/28; 208/364
[58] Field of Search ...................... 122/31, 28, 40, 359, 122/208; 196/139, 100, 105, 110; 208/364

[56] References Cited

U.S. PATENT DOCUMENTS

| 968,760 | 8/1910 | Frasch | 196/100 X |
|---|---|---|---|
| 1,107,803 | 8/1914 | Koppers | 196/139 X |
| 1,523,497 | 1/1925 | Smith | 196/139 |
| 2,779,315 | 1/1957 | Tucker | 122/208 |

FOREIGN PATENT DOCUMENTS 586533 11/1959 Canada ..................................... 122/28

Primary Examiner—Edward G. Favors
Attorney, Agent, or Firm—Stephen E. Revis

[57] ABSTRACT

The object of the invention is to provide a process for vaporizing liquid hydrocarbon fuels efficiently and without the formation of carbon residue on the apparatus used.

The process includes simultaneously passing the liquid fuel and an inert hot gas downwardly through a plurality of vertically spaced apart regions of high surface area packing material. The liquid thinly coats the packing surface, and the sensible heat of the hot gas vaporizes this coating of liquid. Unvaporized liquid passing through one region of packing is uniformly redistributed over the top surface of the next region until all fuel has been vaporized using only the sensible heat of the hot gas stream.

2 Claims, 2 Drawing Figures

PROCESS FOR VAPORIZING A LIQUID HYDROCARBON FUEL

DESCRIPTION

The Government has rights in this invention pursuant to Contract No. EX-76-C-01-2102 awarded by the Department of Energy.

TECHNICAL FIELD

The present invention relates to a method for vaporizing liquid fuel.

BACKGROUND ART

Steam reforming reactors, hydrodesulfurizers, and the like often require that the hydrocarbon fuel to be processed be introduced into the apparatus in vaporous or gaseous form. In prior art processes liquid hydrocarbon fuel has been vaporized using an external burner to boil the liquid fuel. The life of these boiler units is short due to the buildup of fuel residues (i.e. carbon) on heat transfer surfaces when temperatures exceed 600° to 900° F.

U.S. Pat. No. 2,893,359 shows a relatively complex apparatus for vaporizing corrosive liquids (as opposed to liquid hydrocarbons) such as halogen and metal halides wherein the liquid is sprayed over and falls downwardly through a bed of porous material while a burner supplies hot combustion gases to the lower part of the bed for upward (countercurrent) flow through the bed to impart heat to the liquid and to the packing material in the bed. The hot gases vaporize a portion of the liquid flowing downwardly through the bed. Liquid which is not vaporized falls into a pool below the bed and is recirculated through the bed. The vapors from the liquid and the spent combustion gases are discharged from a conduit above the bed. Aside from its complexity, this vaporization system is not suitable for vaporizing liquid hydrocarbon fuels, since a portion of the fuel would be combusted upon encountering the burner flame at the lower end of the packing column and the afterburner flame above the packing column.

There are numerous patents describing the fractional distillation and separation of liquid hydrocarbons which include vaporization of the liquid feedstock. Some examples are U.S. Pat. Nos. 968,760; 1,523,497; 2,707,163; and 2,779,315. In these processes the apparatus typically comprises a vertical column containing a plurality of beds of packing material vertically spaced apart. The liquid hydrocarbon is boiled at the bottom of the column such that fuel vapors rise up the column and are condensed on the packing material. Heavier hydrocarbons condense out on packing material near the bottom of the column while lighter hydrocarbons rise further up the column where temperatures are lower. (Note in U.S. Pat. Nos. 968,760 and 1,523,497 that condensate on the walls of the conduit is redirected toward the center of the bed by annular deflectors.) As the condensate falls to lower levels, portions are revaporized by the countercurrent upward flow of gas which is hotter near the bottom of the column. (The heaviest portions of the fuel are usually not vaporized, but are collected at the bottom.) In this manner vapors of different hydrocarbons may be drawn off over the length of the column.

While these processes may be well suited for distillation and fractionation as a pure fuel vaporizer they have several disadvantages. First, vaporization is still accomplished by boiling the hydrocarbon, and this results in residue or carbon buildup on hot surfaces which necessitates occasional shutdown for cleaning. Second, countercurrent flow between the rising hot gas and the falling liquid is not conducive to efficient vaporization over a wide range of fuel flow rates. This is because the upward flow of gas has a tendency to entrain liquid fuel droplets before they are vaporized and carry them out of the conduit along with vaporized fuel. Entrainment becomes more of a problem at higher fuel and gas flow rates. High upward gas flow rates also tend to dry out the lower portions of packing regions, overloading the upper regions which don't have the surface area to accommodate all the liquid fuel. The result is that liquid fuel may be blown out the top of the vaporizer.

DISCLOSURE OF THE INVENTION

One object of the present invention is a simple method to efficiently vaporize liquid hydrocarbon fuel.

Another object of the present invention is to vaporize liquid hydrocarbon fuel without a buildup of carbon on the surfaces of the vaporizing apparatus.

Yet another object of the present invention is a method for vaporizing liquid hydrocarbon fuel which works equally well over a large range of fuel flow rates.

Accordingly, the process for vaporizing a liquid hydrocarbon fuel according to the present invention includes the steps of passing the liquid fuel downwardly thru a plurality of vertically spaced apart regions of packing material disposed in a vertical conduit thereby coating the surfaces of the packing material with a film of liquid fuel, including uniformly distributing or redistributing any unvaporized liquid fuel over the top surface of each region of packing material; vaporizing the liquid fuel using only the sensible heat from an inert hot gas by passing the hot gas downwardly through the regions of packing material concurrently with the liquid fuel; and removing the vaporized fuel and hot gas mixture from the conduit.

The phrase "inert hot gas" is used in this specification to mean a gas which does not chemically react with or result in combustion of the fuel.

Using only the sensible heat of an inert hot gas to vaporize liquid fuel eliminates the exceedingly high wall surface temperatures associated with prior art apparatus wherein a burner is used to boil the fuel. Wall temperatures remain low enough in the process of the present invention such that carbon formation does not occur. Downward co-flow (i.e. flow in the same direction) of the hot gas and the liquid fuel maximizes the length of time the fuel is in contact with the hot gases thereby minimizing the volume of packing material and the length of the conduit necessary to accomplish complete vaporization. The spaces between the vertically spaced regions or beds of packing material are utilized to uniformly redistribute, over the top surface of the next region, any as yet unvaporized liquid fuel which passed through the previous region. This also improves the efficiency and ultimately reduces the size and cost of the vaporizing apparatus.

Finally, the co-flow of the hot gases and the liquid fuel in combination with the uniform distribution or redistribution of unvaporized liquid fuel over the top surface of each succeeding region of packing material permits complete fuel vaporization, without carbon buildup, over a very wide range of fuel flow rates using, simply, a constant ratio of liquid fuel to hot gas.

BEST MODE FOR CARRYING OUT THE INVENTION

Figure 1:
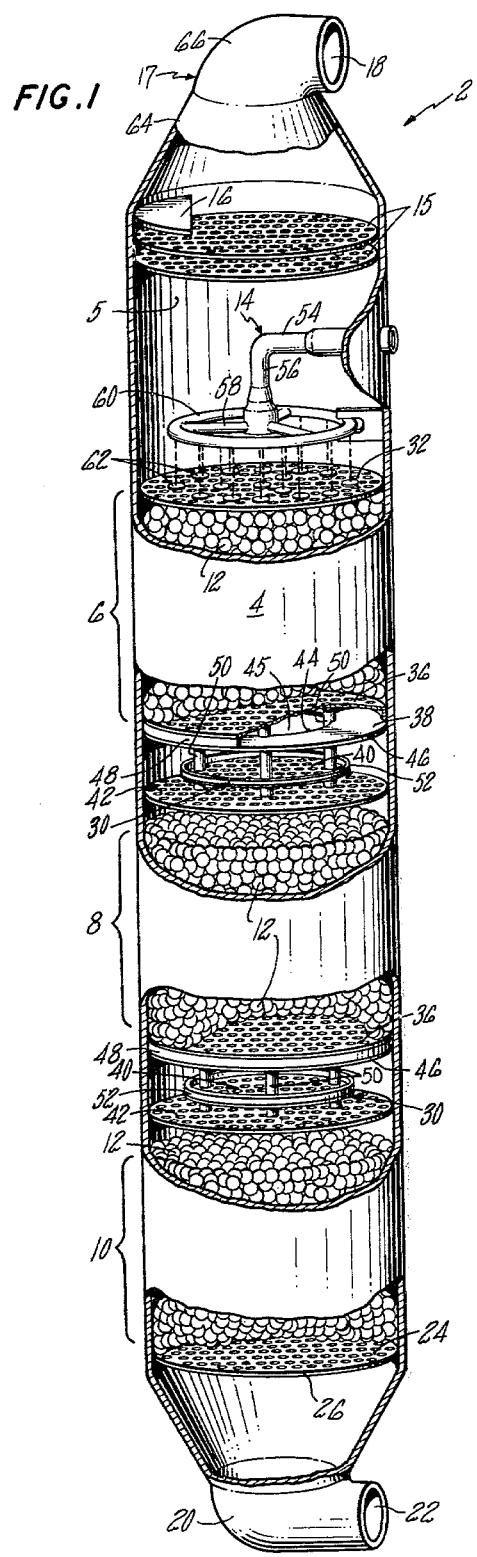
FIG. 1 is a perspective view, partly broken away, of vaporizing apparatus used in the process of the present invention.

Referring to FIG. 1, vaporizing apparatus for practicing the process of the present invention is generally represented by the reference numeral 2. The apparatus 2 comprises a vertically oriented cylindrical conduit 4 having an inner wall surface 5. Disposed within the conduit 4 are three separate vertically spaced apart beds of regions 6, 8, 10 of high surface area, low pressure drop, heat transfer packing material 12. Disposed within the conduit 4 above the uppermost region 6 of packing material is liquid fuel inlet means 14, pressure drop plates 15, and a gas deflector 16. Above the gas deflector 16 is end cap means 17 defining a hot gas inlet 18 to the conduit 4. At the lower end of the conduit 4 below the lowermost region 10 of packing material, is end cap means 20 defining a gas outlet 22 from the conduit 4.

The region 10 is supported upon a foraminous or perforated circular packing support plate 24 welded around its circumference 26 to the inner wall surface 5 of the conduit 4. Each of the other regions of packing material 6, 8 are supported by a fuel distributor assembly comprising a foraminous or perforated circular packing support plate 36, an annular deflector plate 38, an upper perforated circular distributor plate 40, a lower perforated circular distributor plate 42 and a plurality of support tubes 43.

The deflector plate 38 is a flat annular plate having an inner circumference 44 and an outer circumference 46. The inner circumference defines a large circular opening 45 axially aligned with the distributor plate 40; the outer circumference is only slightly smaller than the inner diameter of the conduit 4. The deflector plate 38 is spaced slightly below the support plate 36 by a cylindrical rim 48 which is welded around its upper and lower circular edges to the outer perimeters of the plates 36, 38, respectively.

The distributor plates 40, 42 are hung from the deflector plate 38 and spaced therefrom and from each other by means of the support tubes 43. The tubes 43 pass through holes in the plates 40, 42 and are welded thereto where they intersect the plates. The upper portions of the tubes 43 fit into appropriately shaped cutouts in the inner circumference 44 of the deflector plate 38 and are welded thereto. While the diameter of the lower deflector plate 42 is only slightly smaller than the inner diameter of the conduit 4, the upper deflector plate 40 has a considerably smaller diameter which is, however, larger than the diameter of the opening 45 in the deflector plate 38. The upper deflector plate 40 also includes an upwardly extending cylindrical rim 52 welded thereto around its entire circumference.

Each assembly 30 is permanently located within the conduit 4 by welding the support plate 36 around its entire perimeter to the inner wall surface of the conduit 4 forming a seal therearound. Each distributor assembly 30 is preferably positioned within the conduit 4 such that its lower distributor plate 42 is spaced a short distance above the top surface of the following region of packing material.

The fuel inlet means 14, in this embodiment, comprises a tube 54 having a vertically disposed portion 56 oriented along the axis of the conduit 4. The tube 54 feeds three horizontally and outwardly extending tubular arms 58 which, in turn, are joined to and feed a toroidal tube 60 positioned horizontally above a perforated plate 32 which rests on the top surface of the uppermost region 6 of packing material. The arms 58 and the toroidal tube 60 include a plurality of small fuel outlet holes (not shown) in their downwardly facing surfaces. Vertically aligned with each fuel outlet hole is a flat splash disk 62 welded to the top surface of the plate 32.

The pressure drop plates 15 are vertically spaced apart and welded around their respective circumferences to the inner wall surface 5. The gas deflector 16 is a segment of a circle and is also welded along the circular portion of its perimeter to the inner wall surface of the conduit 4.

In operation a liquid hydrocarbon fuel is introduced into the conduit 4 via the fuel inlet means 14. Narrow jets of the fuel are sprayed downwardly through small holes in the arms 58 and the toroidal tube 60. The liquid fuel jets hit the splash disks 62 which breaks the liquid jets into smaller droplets and distributes them substantially uniformly throughout the cross section of the conduit 4 whereupon the droplets pass downwardly into the region 6 through the perforations in the plate 32.

Simultaneously with the introduction of liquid fuel into the conduit 4, an inert hot gas stream enters the apparatus 2 through the inlet 18 of the end cap means 17. In this embodiment the end cap means 17 comprises a frustrum of a cone 64 which mates, at its larger diameter end, with the top of the conduit 4, and at its upper small diameter end with an elbow 66. As the gas stream leaves the elbow 66 and enters the cone 64, its momentum results in a pressure gradient in a direction perpendicular to the axis of the cone 64. The deflector 16 is positioned at the base of the cone 64 where the gas flow is strongest. The deflector interrupts the flow causing turbulence within the cone 64 and a more uniform flow of gas over the entire cross section of the conduit 4 as the gas enters the conduit. Perforated plates 15 create a small pressure drop within the conduit 4 which results in a further diffusion of the hot gas throughout the cross section of the conduit 4.

As the hot gas contacts the liquid fuel in the volume between the fuel inlet means 14 and the top surface of the region 6, some of the fuel is immediately vaporized. Fuel which is not vaporized passes down through and forms a film on the surfaces of the packing 12 in the region 6. As the hot gas flows through the region 6 it heats the packing 12 and also contacts the thin films of fuel disposed on the surfaces of the packing, thereby resulting in further vaporization of the liquid fuel.

Fuel which is still not vaporized and which has not attached itself to the packing 12 in the first region 6 passes through the support plate 36 and thence through the opening 45 in the deflector plate 38. The deflector plate 38 redirects liquid attached to and moving downwardly along the wall surface 5 of the conduit 4 back towards the center of the conduit. The liquid then falls onto the upper distributor plate 40 which acts as a diffuser to uniformly spread the fuel out over a large cross-sectional area in the central portion of the conduit. The liquid then falls onto the lower distributor plate 42 which further distributes it substantially uniformly over the entire cross section of the conduit and over the top surface of the region 8 of packing material 12. Some of the liquid passing from the region 6 into the region 8 is vaporized in the space therebetween, while the remainder falls downwardly through the region 8 and, as before, forms a thin film on the surfaces of the packing 12 wherein the sensible heat in the hot gases vaporizes more of the liquid. This sequence of events continues through the last region 10 of packing material by which time all the liquid has been vaporized and only a mixture of fuel vapors and the hot gas exits from the outlet 22.

For one particular application it was required to be able to vaporize, in the same apparatus, fuel flows ranging from as low as 190 to as high as 1,170 lbs/hr. Apparatus similar to that shown in FIG. 1 with three regions of packing was used. The number of regions required and the volumes thereof is selected so as to assure complete vaporization of the fuel, under the worst conditions which might be encountered, using only the sensible heat in the hot gas stream. The conduit 4 was about 62 inches long with an inner diameter of about 12 inches. Each region 6, 8, 10 of packing material was about 12 inches long with about 5 inches between regions. The top surface of the first region, region 6, was about 15 inches from the top of the conduit 4.

Figure 2:
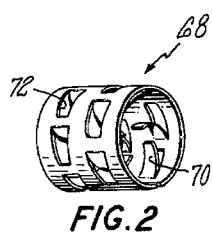
FIG. 2 is a perspective view of a pall ring which may be used as the packing material of the present invention.

The packing consisted of pall rings such as shown in FIG. 2. Each ring 68 was made from 0.018 inch thick cabon steel formed into the shape of a cylinder 0.625 inch long by 0.625 inch in diameter. A plurality of tabs 70 extend inwardly around the inner wall surface of each ring, the tabs being formed by punching slots 72 in the ring wall. Of course any nonreactive, high surface area, highly open packing material with good heat transfer qualities may be used in the method of the present invention, the object being to provide a large surface area with minimum pressure drop through the apparatus.

Each deflector plate 38 was positioned about 0.5 inch below the support plate 36, and the diameter of the opening 45 in each deflector plate 38 was 7 inches. Each upper distributor plate 40 had a diameter of about 9 inches and was spaced about 2.5 inches below the deflector plate 38 and about 0.9 inch above the lower distributor plate 42. Each plate 42 was positioned about 1.0 inch above the top surface of the packing. All of the perforated plates, including the packing support plates, were perforated with 0.125 inch uniformly distributed holes to the extent that the plates were 40% open, except the pressure drop plates 15 which were 30% open.

With this apparatus we were able to completely vaporize anywhere from 190 to 1,170 lbs/hr of liquid naptha using a hot gas stream comprising approximately 70% hydrogen and 30% carbon dioxide, by volume. A constant ratio of 1:1.67 fuel to gas, by weight, was maintained for all fuel flow rates. In each case the liquid fuel was introduced into the apparatus at a temperature of about 30° C.; and the hot gas stream entering the apparatus was at a temperature of about 390° C. No significant traces of carbon buildup on the wall surfaces of the apparatus occurred at any time.

Although the invention has been shown and described with respect to the preferred embodiment thereof, it should be understood by those skilled in the art that various changes and omissions in the form and detail thereof may be made therein without departing from the spirit and scope of the invention.

We claim:

1. In a process for vaporizing a liquid hydrocarbon fuel, the steps of:

introducing the liquid fuel into a substantially vertical conduit having a plurality of regions of closely packed, high void volume, high surface area inert packing material disposed therein, said regions of packing material each having a top surface and being spaced apart vertically within the conduit, each region of packing material being supported by a foraminous material extending across the conduit, wherein said liquid fuel is distributed substantially uniformly over the top surface of the uppermost region of packing material and passes down through the conduit over the packing material within each region coating the surfaces of the packing material with a film of liquid;

redistributing, over the top surface of each region of packing material following the uppermost region, all unvaporized liquid fuel passing through the immediately preceeding region;

vaporizing the said liquid fuel by (1) introducing an inert hot gas into the conduit above the top surface of the uppermost region simultaneously with the said step of introducing liquid fuel into the conduit, the hot gas having sufficient sensible heat to vaporize all the liquid fuel, and (2) passing the hot gas down through the conduit over the packing material in said regions, the number of regions and volume of packing material being selected to assure complete vaporization of all the liquid fuel sprayed into the conduit using only the sensible heat of the hot gas; and removing the vaporized fuel and hot gas mixture from the conduit after it has passed through the lowermost region of packing material 2. The vaporizing process of claim 1, wherein the step of redistributing all unvaporized liquid fuel passing through the immediately preceeding region includes:

deflecting toward the central portion of the conduit, that portion of the unvaporized liquid fuel running down the inside walls of the conduit using deflecting means positioned in the space between adjacent regions; and then passing all the unvaporized liquid fuel through at least one horizontal perforated plate means disposed in the space between adjacent regions and positioned below the deflector means disposed in said same space.

* * * * *